US009700958B2

(12) United States Patent
Bergmann et al.

(10) Patent No.: US 9,700,958 B2
(45) Date of Patent: Jul. 11, 2017

(54) APPARATUS FOR FRICTION STIR WELDING

(71) Applicant: Helmholtz-Zentrum Geesthacht Zentrum fuer Material—und Kuestenforschung GmbH, Geesthacht (DE)

(72) Inventors: Luciano Bergmann, Geesthacht (DE); Jorge Fernandez Dos Santos, Tespe (DE)

(73) Assignee: Helmholtz-Zentrum Geesthacht Zentrum fuer Material—und Kuestenforschung GmbH, Geesthacht (DE)

( * ) Notice: Subject to any disclaimer, the term of this patent is extended or adjusted under 35 U.S.C. 154(b) by 0 days.

(21) Appl. No.: 15/059,575

(22) Filed: Mar. 3, 2016

(65) Prior Publication Data

US 2016/0271725 A1 Sep. 22, 2016

(30) Foreign Application Priority Data

Mar. 18, 2015 (EP) .................................... 15159641

(51) Int. Cl.
*B23K 20/12* (2006.01)
(52) U.S. Cl.
CPC ........ *B23K 20/125* (2013.01); *B23K 20/1255* (2013.01)
(58) Field of Classification Search
CPC ...................... B23K 20/122–20/128
(Continued)

(56) References Cited

U.S. PATENT DOCUMENTS 5,713,507 A 2/1998 Holt et al.
5,893,507 A * 4/1999 Ding .................... B23K 20/125
156/580

(Continued)

FOREIGN PATENT DOCUMENTS

CN 104070288 A * 10/2014
JP 2013111655 A * 6/2013 ............. B23K 20/10

(Continued)

OTHER PUBLICATIONS

Communication dated Sep. 28, 2015, from the European Patent Office for corresponding European application No. EP 15159641.8.

*Primary Examiner* — Kiley Stoner
(74) *Attorney, Agent, or Firm* — Harness, Dickey & Pierce, P.L.C.

(57) ABSTRACT

An apparatus for friction stir welding with a drive shaft, a probe, which has a first friction surface, and a shoulder element having a second friction surface. An annular cavity is formed between an inner surface of the shoulder element and the drive shaft and/or the probe. The shoulder element includes first and second through holes that are spaced apart in the longitudinal direction. An annular ring element is rotatable with respect to the shoulder element and is rotatably supported on the shoulder element by first and second support members between which an annular channel is formed. The annular channel is arranged such that the first through hole connects the annular channel with the annular cavity. The annular ring element radially outwardly delimits the annular channel and includes a through bore which extends to the annular channel.

12 Claims, 1 Drawing Sheet

Figure 1:
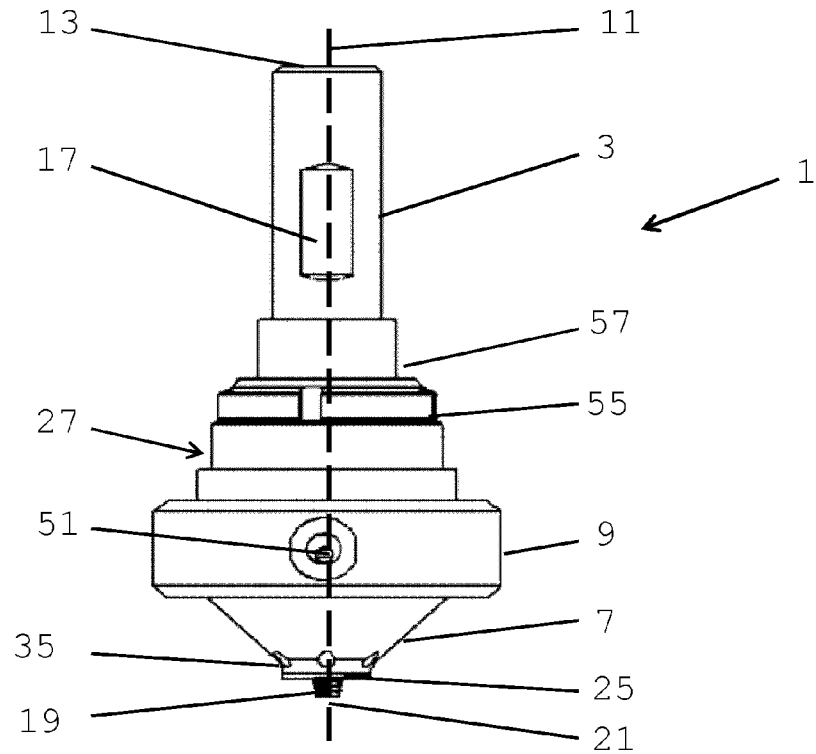

(58) Field of Classification Search
USPC .............................................. 228/112.1, 2.1
See application file for complete search history.

(56) References Cited

U.S. PATENT DOCUMENTS

| | | | | |
|---|---|---|---|---|
| 6,199,745 | B1* | 3/2001 | Campbell | B23K 20/123 228/112.1 |
| 6,264,088 | B1* | 7/2001 | Larsson | B23K 20/125 228/112.1 |
| 6,516,992 | B1* | 2/2003 | Colligan | B23K 20/1235 228/112.1 |
| 7,234,625 | B2 | 6/2007 | Loitz et al. | |
| 7,575,149 | B2 | 8/2009 | De Traglia Amancio Filho et al. | |
| 7,607,558 | B2 | 10/2009 | Loitz et al. | |
| 7,780,918 | B2 | 8/2010 | Segal et al. | |
| 7,882,998 | B2 | 2/2011 | Roos et al. | |
| 7,954,691 | B2 | 6/2011 | Roos et al. | |
| 8,025,827 | B2 | 9/2011 | De Traglia Amancio Filho et al. | |
| 8,518,198 | B2 | 8/2013 | De Traglia Amancio Filho et al. | |
| 8,567,302 | B2 | 10/2013 | Scholten et al. | |
| 8,714,431 | B2 | 5/2014 | Roos et al. | |
| 8,893,951 | B2 | 11/2014 | dos Santos et al. | |
| 8,998,064 | B2* | 4/2015 | Russell | B23K 20/1235 228/112.1 |
| 2003/0183673 | A1* | 10/2003 | Hansen | B23K 20/125 228/2.1 |
| 2006/0006209 | A1 | 1/2006 | Loitz et al. | |
| 2006/0006211 | A1 | 1/2006 | Loitz et al. | |
| 2006/0032887 | A1* | 2/2006 | Haynie | B23Q 3/12 228/2.1 |
| 2006/0043151 | A1* | 3/2006 | Stol | B23K 20/1255 228/2.1 |
| 2006/0043152 | A1* | 3/2006 | Stol | B23K 20/1255 228/2.1 |
| 2006/0081679 | A1* | 4/2006 | Sato | B23K 20/125 228/2.1 |
| 2006/0102699 | A1* | 5/2006 | Burton | B23K 20/123 228/112.1 |
| 2006/0124691 | A1* | 6/2006 | Wood | B23K 20/1245 228/2.1 |
| 2006/0289603 | A1 | 12/2006 | Zettler et al. | |
| 2006/0289604 | A1 | 12/2006 | Zettler et al. | |
| 2007/0040006 | A1* | 2/2007 | Charles | B23K 20/122 228/112.1 |
| 2007/0040007 | A1* | 2/2007 | Sato | B23K 20/1265 228/112.1 |
| 2008/0128473 | A1* | 6/2008 | Zhou | B23K 20/126 228/2.3 |
| 2008/0218014 | A1* | 9/2008 | Cowan | B23K 20/125 310/83 |
| 2009/0123778 | A1 | 5/2009 | Russell et al. | |
| 2010/0038832 | A1* | 2/2010 | Rosal | B23K 20/1255 266/46 |
| 2010/0147925 | A1* | 6/2010 | Hanlon | B23K 20/233 228/112.1 |
| 2010/0178526 | A1* | 7/2010 | Fujii | B23K 20/1235 428/615 |
| 2012/0128445 | A1* | 5/2012 | Hotte | F16B 17/006 411/82 |
| 2012/0248174 | A1 | 10/2012 | dos Santos et al. | |
| 2012/0267419 | A1* | 10/2012 | Blaski | B23K 20/126 228/2.1 |
| 2013/0119115 | A1* | 5/2013 | Kato | B23K 20/1255 228/112.1 |
| 2013/0134206 | A1 | 5/2013 | Roos et al. | |
| 2016/0059476 | A1 | 3/2016 | Bastos Abibe et al. | |
| 2016/0067818 | A1 | 3/2016 | Hutsch et al. | |

FOREIGN PATENT DOCUMENTS

| | | |
|---|---|---|
| WO | WO-93/10935 A1 | 6/1993 |
| WO | WO-98/51441 A1 | 11/1998 |

* cited by examiner

APPARATUS FOR FRICTION STIR WELDING

CROSS-REFERENCE TO RELATED APPLICATIONS

This application claims the benefit and priority of European Patent Application No. 15159641.8 filed Mar. 18, 2015. The entire disclosure of the above application is incorporated by reference as if fully set forth in detail herein.

FIELD

The present disclosure relates to an apparatus for friction stir welding.

BACKGROUND

This section provides background information related to the present disclosure which is not necessarily prior art.

The principle of friction stir welding is described in WO 93/10935 and involves a rotationally driven tool to join together two abutting workpieces which are typically formed of metallic material. The two metal workpieces may be placed surface against surface (lap joint) or next to one another such that they are butted against each other with their narrow side surfaces (butt joint). The material of the two workpieces is initially plasticized and intermixed due to the frictional heat that results from the movement of the rotating friction stir welding tool in between the two surfaces. After some time the material at the interface of the two metal work pieces cools down and solidifies again such that the two metal work pieces are welded together.

The frictional heat that is generated due to the rotation of the friction stir welding tool in between the two facing work pieces does not only heat up the two abutting surfaces but is also transferred into the friction stir welding tool. The rotating probe and the shoulder element are particularly heated resulting in excessive process temperatures also in the region around the probe and thus in the shoulder element, which significantly reduces the life time of the entire friction stir welding tool.

Apparatuses for friction stir welding are already known from the prior art, such as for example WO 98/51441 or U.S. Pat. No. 6,199,745 B1. These apparatuses usually comprise a probe with an engagement portion for engaging with the two facing work pieces and a shoulder element for bearing against the surfaces of the two working pieces. The probe and the shoulder elements are driven in a rotating manner with a drive shaft.

The tool of WO 98/51441 further comprises a cooling mechanism. A cooling medium is transported into the interior of the friction stir welding tool via supply means. These supply means comprise one elongate conduit that extends through the tool facing directly the probe, which may be consequently cooled down during the welding process. The device described in U.S. Pat. No. 6,199,745 B1 also comprises conduits to supply parts of the interior of the welding tool with a cooling fluid, whereas these conduits do not cross the probe and the shoulder element.

SUMMARY

This section provides a general summary of the disclosure, and is not a comprehensive disclosure of its full scope or all of its features.

In one form, the present teachings provide an apparatus for friction stir welding. The apparatus includes a drive shaft, a probe, a shoulder element and an annular ring element. The drive shaft extends along a longitudinal direction that coincides with an axis of rotation of the drive shaft. The drive shaft has a drive end and a second end opposite the drive end. The drive end is configured to be coupled to a source of rotary power. The probe is formed on the second end of the drive shaft and extends along the longitudinal direction. The probe has a circumferential first friction surface, which extends along the longitudinal direction, and a distal end that is remote from the drive shaft. The shoulder element has a second annular friction surface that extends away from the longitudinal direction and faces towards the free end. The shoulder element is supported on the drive shaft. An annular cavity is formed between the drive shaft and/or the probe on the one hand and an inner surface of the shoulder element on the other hand. The shoulder element includes first and second through holes that extend from an outer surface thereof to the inner surface. The first and second through holes are spaced apart in the longitudinal direction. The annular ring element surrounds and is rotatable with respect to the shoulder element around an axis that coincides with the longitudinal direction. The annular ring element is rotatably supported on the shoulder element by first and second support members between which an annular channel is formed. The annular channel is arranged such that the first through hole connects the annular channel with the annular cavity. The annular ring element radially outwardly delimits the annular channel and comprises a through bore which extends to the annular channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
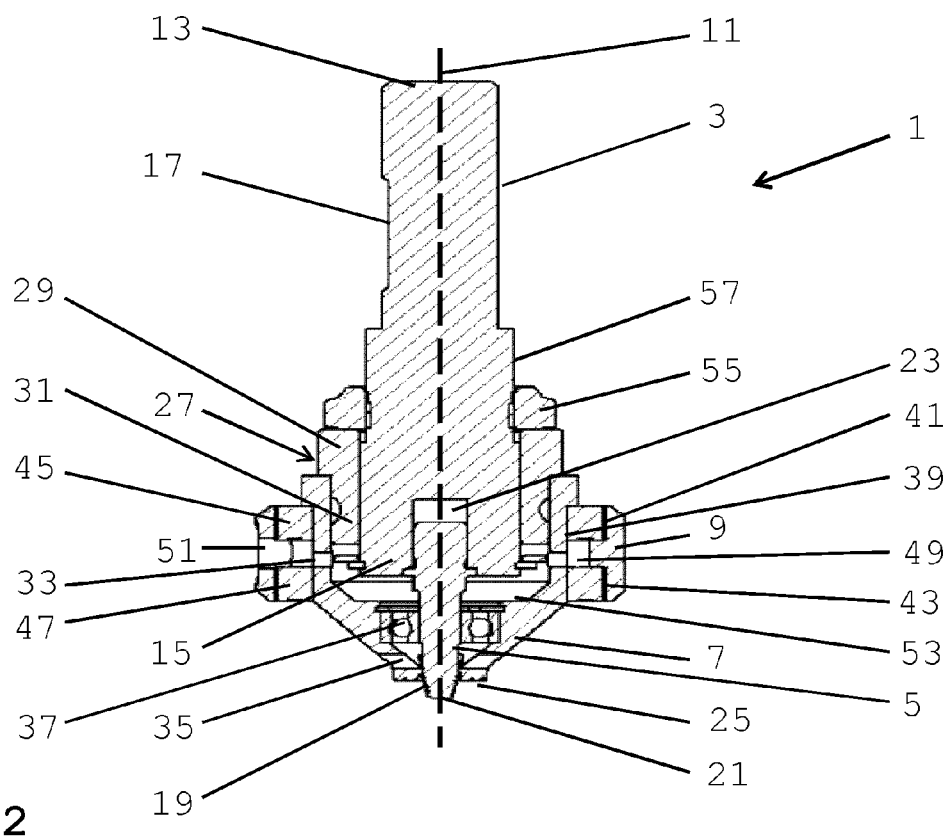

FIG. 1 is a side view of an exemplary embodiment of an apparatus for friction stir welding according to the teachings of the present disclosure; and FIG. 2 is a sectional view along the axis of rotation of the exemplary embodiment of FIG. 1.

Corresponding reference numerals indicate corresponding parts throughout the several views of the drawings.

DETAILED DESCRIPTION

Example embodiments will now be described more fully with reference to the accompanying drawings.

In the figures, an exemplary embodiment of an apparatus 1 for friction stir welding constructed in accordance with the teachings of the present disclosure is shown. The apparatus 1 for friction stir welding comprises a drive shaft 3, a probe 5, a shoulder element 7 and an annular ring element 9.

The drive shaft 3 has a substantially cylindrical form and can be driven in a rotating manner with respect to an axis of rotation 11 which coincides with the longitudinal direction of the apparatus. The drive shaft 3 has a drive end 13 and a second end 15, opposite from the drive end 13 in the longitudinal direction or the axis of rotation 11. A rotating drive such as a drive spindle can be coupled with the drive end 13. Between the drive end 13 and the second end 15 the drive shaft 3 comprises a recess 17 such that the drive shaft 3 can be secured in a rotationally fixed manner to a drive shaft.

The probe 5 also has a cylindrical form and is formed on the second end 15 of the drive shaft. The probe 5 extends in the longitudinal direction with respect to the axis of rotation 11 having a circumferential first friction surface 19 with a distal end 21 that is remote from the drive shaft 3 to generate greater friction during the engagement with the material of the work pieces.

As can be seen from FIG. 2, the second end 15 of the drive shaft 3 comprises a cylindrical cavity 23 with an inner diameter that corresponds to the diameter of the probe 5 in the present exemplary embodiment. That means the probe 5 is formed as a separate element releasably coupled with the drive shaft 3. In another embodiment, that is not shown, the probe 5 can be formed with the drive shaft 3 in one piece.

The shoulder element 7, mainly arranged concentrically around the probe 5 with respect to the axis of rotation 11, has in the present exemplary embodiment a substantially conical shape with a cone tapering with a free end towards the distal end 21 of the probe 5. Furthermore, the shoulder element 7 has a second annular friction surface 25, which is arranged perpendicularly to the axis of rotation 11 and is directed to the distal end 21 of the probe 5.

The substantially conical shape of the shoulder element 7 proved to be advantageous for allowing the heat produced by friction between a workpiece surface and the second annular friction surface 25 during a linear movement of the apparatus to be absorbed as much as possible and dissipated.

The shoulder element 7 is supported on the drive shaft 3, wherein the shoulder element 7 is rotatably connected to the drive shaft 3 with respect to the longitudinal direction. For that purpose, a bearing device 27 is provided on the drive shaft, wherein this bearing device 27 comprises a first section 29 with a first diameter and a second section 31 with a second diameter that is smaller than the first diameter, so that the first and second sections 29, 31 are arranged to form a step. The second section 31 of the bearing device 27 serves to support the shoulder element 7.

The shoulder element 7 further comprises first and second through holes 33, 35 extending perpendicularly to the axis of rotation 11 from the outer surface of the shoulder element 7 to the inner surface, wherein the first and second through holes 33, 35 are spaced apart in the longitudinal direction of the shoulder element 7. The distance between the first through holes 33 and the second annular friction surface 25 of the shoulder element 7 is larger than the distance of the second through holes 35 and the second annular friction surface 25 of the shoulder element 7 in the longitudinal direction.

The shoulder element 7 further comprises a bearing member 37 for supporting the probe 5, which is preferentially positioned with respect to its longitudinal direction between the first and second through holes 33, 35. The bearing member 37 surrounds the probe 5 and the axis of rotation 11 and is formed in the exemplary embodiment by means of a ball bearing. This ball bearing is intended for radially supporting the probe 5 by the shoulder element 7.

Between the bearing member 37 and an end of the shoulder element 7 that is opposite to its free end in the longitudinal direction, the shoulder element 7 has a cylindrical section 39 with side walls extending parallel to the axis of rotation 11. The cylindrical section 39 of the shoulder element 7 is surrounded by the annular ring element 9, which is rotatable with respect to the shoulder element 7 around an axis that coincides with the longitudinal direction. The annular ring element 9 has a first and a second internal surface 41, 43, which are parallel to each other and parallel to the axis of rotation 11. The annular ring element 9 is rotatably supported on the shoulder element 7 by first and second support members 45, 47, which are spaced apart from each other in the axial direction and are parallel to each other with respect to the axis of rotation 11 so that they abut against the internal surfaces 41, 43 of the annular ring element 9. In the present exemplary embodiment of the apparatus 1 for friction stir welding the first and second support members 45, 47 are formed as bearing assemblies.

An annular channel 49 is consequently formed inside the annular ring element 9 between the first and second support members 45, 47. Thus, the annular ring element 9 radially outwardly delimits the annular channel 49, and it comprises a through bore 51 which extends to the annular channel 49 perpendicularly to the axis of rotation 11. The annular channel 49 is arranged around the cylindrical section 39 of the shoulder element 7 such that the first through hole 33 of the shoulder element 7 connects the annular channel 49 with an annular cavity 53. This annular cavity 53 is formed between an inner surface of the shoulder element 7 and the drive shaft 3 and the probe 5.

The axial position of the shoulder element 7 along the longitudinal direction is adjustable with respect to the probe 5 in the present invention. For this purpose, the shoulder element 7 is slidably supported along the longitudinal direction on the drive shaft 3, which is provided with a stop member 55 that is located on that side of the shoulder element 7 opposite the second annular friction surface 25 and abuts on the bearing device 27 on the drive shaft. In a preferred embodiment, the stop member 55 is formed as a nut and the drive shaft 3 is further provided with a thread 57 extending in an area between the bearing device 27 and the drive end 13. The stop member 55 then threadingly engages with the drive shaft 3 and is adjustable along the longitudinal direction. Since the shoulder element 7 is fixedly mounted with the bearing device 27, which in turn is slidably mounted on the drive shaft 3 along the longitudinal direction, the shoulder element 7 can axially be adjusted in the axial direction of the axis of rotation 11 by turning the nut and the length with which the probe 5 protrudes from the second annular friction surface 25 in longitudinal direction is consequently adjusted, too.

The apparatus 1 for friction stir welding according to the present invention operates as follows.

At the beginning, two substantially flat workpieces, for example metallic plates or sheets, are placed against each other with those surfaces that are intended to be welded together (not represented). In this case, the two metallic workpieces are placed against one another along their end faces, i.e., generally the narrower sides, such that they are joined at these surfaces (butt joint). The apparatus 1 for friction stir welding of the invention is then moved with the probe 5 along these surfaces to be joined, wherein the probe 5 rotates in relation to the shoulder element 7 and the second annular friction surface 25 of the shoulder element 7 linearly bears against the two workpieces. The axis of rotation 11 and the probe 5 run in this case parallel to the plane that is defined by the surfaces lying against one another.

In another case, parts of the two workpieces may also overlap, wherein the respectively overlapping surfaces are to be joint (lap joint). The axis of rotation 11 then runs perpendicularly to the bearing plane and the apparatus 1 for friction stir welding may be moved along the entire contact surface of the workpieces or is introduced specifically at individual locations.

The length of the circumferential first friction surface 19 of the rotating probe 5 that protrudes beyond the second annular friction surface 25 of the shoulder element 7 and is necessary for the respective welding process can be manually adjusted in a simple manner. The stop member 55, which is preferentially formed as a nut and abuts on the bearing device 27 between the drive shaft 3 and the shoulder element 7, is turned around the thread 57 such that the nut is offset in the longitudinal direction towards or away from the free end of the drive shaft 3. Consequently, the position of the bearing device 27 and the shoulder element 7 is also adjusted in the axial direction towards or away from the free end of the drive shaft 3 relative to the fixed position of the probe 5 in the longitudinal direction. The length of the circumferential first friction surface 19 of the probe 5 is finally increased or reduced.

During the welding process the second annular friction surface 25 contacts the workpieces. Consequently, the probe 5 and the second shoulder element 7 are heated due to the frictional heat that is generated by the movement of the probe 5 of the friction stir welding tool in between the workpieces. The thermal loading of the probe 5 and the shoulder element 7 is reduced due to a skilled cooling system described in the following.

With the improved cooling system of the present invention, the entire lower part of the apparatus 1 for friction stir welding, i.e., the shoulder element 7 and the probe 5, is cooled down during the friction welding process. The cooling fluid enters the annular ring element 9 from an outside cooling fluid source (not shown) across the through bore 51 and penetrates the annular channel 49, wherein the annular channel 49 is completely filled with the cooling fluid. Within the cylindrical section 39 of the shoulder element 7 the cooling fluid further penetrates across the first through hole 33 into the annular cavity 53 that is defined in the direction perpendicular to the axis of rotation 11 between the inner surface of the shoulder element 7 and the drive shaft 3 and the probe 5. In the longitudinal direction this annular cavity 53 extends between the first and second through holes 33, 35, which represent entrance and exit means of the cooling fluid, respectively.

With such a configuration, the annular cavity 53 is completely flooded with cooling fluid thus cooling the probe 5 circumferentially and the shoulder element 7 along its entire inner surface in the longitudinal direction. The probe 5 and the shoulder element 7 are effectively cooled during the welding process and their respective life time is significantly increased.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for friction stir welding comprising:
a drive shaft extending along a longitudinal direction which coincides with an axis of rotation of the drive shaft, and having a drive end and a second end opposite the drive end, the drive end being adapted to be coupled to rotational drive means,
a probe formed on the second end of the drive shaft, extending along the longitudinal direction, having a circumferential first friction surface extending along the longitudinal direction, and having a distal end remote from the drive shaft, and
a shoulder element having a second annular friction surface extending away from the longitudinal direction and facing towards the free end,
wherein the shoulder element is supported on the drive shaft,
wherein an annular cavity is formed between an inner surface of the shoulder element and at least one of the drive shaft and the probe, wherein the shoulder element comprises first and second through holes extending from an outer surface thereof to the inner surface, the first and the second through holes being spaced apart in the longitudinal direction, and wherein the annular cavity extends in the longitudinal direction between the first and second through holes,
wherein an annular ring element is provided which surrounds and is rotatable with respect to the shoulder element around an axis that coincides with the longitudinal direction, the annular ring element being rotatably supported on the shoulder element by first and second support members between which an annular channel is formed,
wherein the annular channel being arranged such that the first through hole connects the annular channel with the annular cavity,
wherein the annular ring element radially outwardly delimits the annular channel and comprises a through bore which extends to the annular channel; and
wherein a bearing member is mounted to the shoulder element, the bearing member supporting the probe and being positioned with respect to the longitudinal direction between the first through hole and the second through hole.

2. The apparatus of claim 1, wherein the support members are formed as bearing assemblies.

3. The apparatus of claim 1, wherein the shoulder element is rotatably supported on the drive shaft with respect to the longitudinal direction.

4. The apparatus of claim 3, wherein a bearing device is provided on the drive shaft for rotatably supporting the shoulder element.

5. The apparatus of claim 1, wherein the axial position of the shoulder element along the longitudinal direction is adjustable.

6. The apparatus according to claim 5, wherein the shoulder element is slidably supported along the longitudinal direction on the drive shaft and
wherein a stop member is provided on that side of the shoulder element opposite the second friction surface, the position of the stop member along the longitudinal direction being adjustable.

7. The apparatus of claim 6, wherein the stop member threadingly engages with the drive shaft.

8. The apparatus of claim 1, wherein the probe is formed as a separate element releasably coupled with the drive shaft.

9. The apparatus of claim 6, wherein the shoulder element is rotatably supported on the drive shaft with respect to the longitudinal direction.

10. The apparatus of claim 9, wherein a bearing device is provided on the drive shaft for rotatably supporting the shoulder element.

11. The apparatus of claim 10, wherein the shoulder element is fixedly mounted on the bearing assembly in the longitudinal direction,
wherein the bearing device is slidably mounted on the drive shaft along the longitudinal direction, and
wherein the stop member abuts on the shoulder element.

12. An apparatus for friction stir welding comprising:
a drive shaft extending along a longitudinal direction which coincides with an axis of rotation of the drive shaft, and having a drive end and a second end opposite the drive end, the drive end being adapted to be coupled to rotational drive means,
a probe formed on the second end of the drive shaft, extending along the longitudinal direction, having a circumferential first friction surface extending along the longitudinal direction, and having a distal end remote from the drive shaft, the probe being formed as a separate element that is releasably coupled with the drive shaft, and
a shoulder element having a second annular friction surface extending away from the longitudinal direction and facing towards the free end, the shoulder element being supported on the drive shaft and defining first and second through holes extending from an outer surface thereof to the inner surface, the first and the second through holes being spaced apart in the longitudinal direction, wherein a bearing member mounted to the shoulder element supports the probe, the bearing member being positioned with respect to the longitudinal direction between the first and the second through holes,
a stop member abutted against a side of the shoulder element opposite the second friction surface, the stop member being threadably enaged with the drive shaft such that the position of the stop member along the longitudinal direction is adjustable,
a bearing device provided on the drive shaft for rotatably supporting the shoulder element, wherein the shoulder element is fixedly mounted on the bearing device in the longitudinal direction, and wherein the bearing device is slidably mounted on the drive shaft along the longitudinal direction, and
an annular ring element is provided which surrounds and is rotatable with respect to the shoulder element around an axis that coincides with the longitudinal direction, the annular ring element being rotatably supported on the shoulder element by first and second bearing assemblies between which an annular channel is formed,
wherein an annular cavity is formed between an inner surface of the shoulder element and at least one of the drive shaft and the probe, wherein the annular cavity extends in the longitudinal direction between the first and second through holes,
wherein the annular channel is arranged such that the first through hole connects the annular channel with the annular cavity, and
wherein the annular ring element radially outwardly delimits the annular channel and comprises a through bore which extends to the annular channel.

* * * * *